Patented Feb. 12, 1935

1,990,954

UNITED STATES PATENT OFFICE 1,990,954

PROCESS OF PREPARING INDANTHRENE BLUE

Wilfred M. Murch, Midland, Mich., assignor to The Dow Chemical Company, Midland, Mich., a corporation of Michigan No Drawing. Application February 13, 1933, Serial No. 656,591

8 Claims. (Cl. 260—31)

The present invention concerns an improved process for preparing N-N'-dihydro-1.2.1'.2'-anthraquinone-azine, commonly known, and hereinafter referred to, as Indanthrene Blue.

Indanthrene Blue is usually prepared by adding dry 2-amino-anthraquinone, with stirring, to a fused caustic alkali mixture containing a relatively strong oxidizing agent such as potassium chlorate or nitrate. The mixture is heated with continued stirring to a temperature between about 220° and 250° C., the reacted mixture is poured into water, and the product is filtered from the aqueous mixture.

During the preparation of Indanthrene Blue according to such usual procedure, the dry 2-amino-anthraquinone tends to float on the surface of the fused caustic alkali mixture or to be unevenly distributed through the latter, with the result that by-product formation is excessive and the yield of the desired product is low.

I have now found that an aqueous slurry of 2-amino-anthraquinone may be added to a fused caustic alkali mixture, such as that described above, to form a substantially homogeneous reaction mixture from which Indanthrene Blue may be produced in relatively high yield. I have further found that by dissolving a strong oxidizing agent, e. g. an alkali metal chlorate or nitrate, in the aqueous slurry of 2-amino-anthraquinone and then adding the slurry, gradually and with stirring, to fused caustic alkali, a substantially homogeneous reaction mixture can be formed from which Indanthrene Blue can be produced in still higher yield.

The invention, then, consists in the improved process hereinafter fully described and particularly pointed out in the claims, the following description and examples setting forth in detail but certain of the various ways in which the principle of our invention may be employed.

In preparing Indanthrene Blue according to my process, a thick aqueous slurry of 2-amino-anthraquinone is added gradually and with stirring to a fused caustic alkali mixture while maintaining the latter at a temperature between about 195° and 250° C., and an oxidizing agent such as sodium chlorate, potassium chlorate, sodium nitrate, potassium nitrate, etc., is incorporated in the reaction mixture.

The proportions of materials to be employed and the exact procedure to be followed in preparing such reaction mixture may be varied considerably. For instance, the exact proportion of water in the aqueous 2-amino-anthraquinone slurry is of little importance. However, I usually employ as small a quantity of water as possible in said slurry, so that the latter is thick and almost paste-like. At least 3.75, and preferably at least 4, parts by weight of caustic alkali should be used per part of 2-amino-anthraquinone, but a greater excess of caustic alkali may be employed, if desired. Either potassium hydroxide alone or a mixture of sodium and potassium hydroxides may be used as the caustic alkali. The reaction mixture should contain sufficient potassium hydroxide to maintain it in fluid condition at the reaction temperature.

The reaction of 2-amino-anthraquinone with fused caustic alkali may be carried out in the absence of an oxidizing agent to form Indanthrene Blue, but the latter is obtained in higher yield when such oxidizing agent is used.

The oxidizing agent, e. g. sodium chlorate, may be incorporated with the fused caustic alkali either before or after the aqueous slurry of 2-amino-anthraquinone has been added to said fused caustic alkali. I find it advantageous, however, to dissolve the oxidizing agent in the aqueous slurry of 2-amino-anthraquinone and to add the resultant mixture gradually and with stirring to the fused caustic alkali. By simultaneously adding the oxidizing agent and the 2-amino-anthraquinone to the fused caustic alkali in such manner, the yield of Indanthrene Blue is increased materially.

The fused reaction mixture, formed by mixing an aqueous slurry of 2-amino-anthraquinone with caustic alkali and a strong oxidizing agent such as an alkali metal chlorate or nitrate in accordance with the foregoing procedure, is stirred and heated to a temperature between about 220° and 250° C., preferably between 220° and 245° C., until the reaction for the formation of Indanthrene Blue is substantially complete, from 1 to 4 hours of such heating being usually required. The reacted mixture is then poured into a sufficient quantity of water to dissolve the caustic alkali and the resultant mixture is blown with air to completely precipitate the Indanthrene Blue product. The latter is filtered from the mixture, washed with water, and dried.

The following examples describe two ways in which the principle of my invention may be applied. It is to be understood, however, that said examples are purely illustrative and are not to be construed as a limitation on the invention.

Example 1

12.2 parts, by weight (0.1 mol.), of powdered potassium chlorate are added to a fused mixture of 255 parts (6.37 mols) of sodium hydroxide and 255 parts (4.55 mols) of potassium hydroxide. The mixture is stirred and maintained at about 240° C., while a thick slurry, prepared by mixing 122.4 parts (0.55 mol.) of 2-amino-anthraquinone with 50 parts of water, is gradually added thereto. After all of the slurry is added, the mixture is heated, with continued stirring, at a temperature between about 240° and 245° C. for about 1 hour. The reacted mixture is then poured into about 5000 parts of water, the resultant aqueous mixture is blown with air to precipitate the Indanthrene Blue product, and the latter is filtered from the mixture, washed with water, and dried.

*Example 2*

12.2 parts, by weight (0.1 mol) of potassium chlorate is dissolved in 50 parts of water and 122.4 parts (0.55 mol) of 2-amino-anthraquinone is thoroughly mixed with the solution. The resultant slurry is added, gradually and with stirring, to a fused mixture of 255 parts (6.37 mols) of sodium hydroxide and 255 parts (4.55 mols) of potassium hydroxide maintained at about 240° C. The addition is made at such rate that foaming is not excessive. Stirring is continued and the reaction mixture is heated at a temperature between about 240° and 245° C. for about 1 hour. The reacted mixture is poured into about 5000 parts of water, the resultant aqueous mixture is blown with air to precipitate the Indanthrene Blue product, and the latter is filtered from the mixture, washed with water, and dried.

To illustrate the substantial increase in yield resulting from the herein described employment of an aqueous slurry of 2-amino-anthraquinone during the preparation of Indanthrene Blue, the actual increases in yield of substantially pure Indanthrene Blue which have been obtained by operating in accordance with the foregoing examples, over the yield obtained through operating according to the aforedescribed usual procedure, while employing similar operating conditions with regard to quantities of reactants, reaction temperature, and time of reaction, are as follows:—

|  | Per cent increase |
|---|---|
| Example 1 | 7.5 |
| Example 2 | 32.6 |

The principle of my invention may be employed in ways other than those hereinbefore stated. For instance, a wetting agent may be added to the aqueous slurry of 2-amino-anthraquinone, for which any of a wide variety of "wetting" agents are suitable; e. g. lower aliphatic alcohols such as ethyl alcohol, propyl alcohol, iso-amyl alcohol; esters such as ethyl acetate, propyl glycollate, ethyl lactate; soaps such as alkali metal oleates, stearates, palmitates, etc., may be used. Such "wetting" agents frequently aid in introducing the 2-amino-anthraquinone into the reaction mixture. In any case, however, the medium employed in the slurry of 2-amino-anthraquinone consists principally of water.

Other modes of applying the principle of my invention may be employed instead of those explained, change being made as regards the process herein described, provided the step or steps stated by any of the following claims or the equivalent of such stated step or steps be employed.

I therefore particularly point out and distinctly claim as my invention:—

1. In a process for making Indanthrene Blue wherein 2-amino-anthraquinone is reacted with fused caustic alkali, the step which consists in adding the 2-amino-anthraquinone to the fused caustic alkali as an aqueous slurry.

2. In a process wherein a fused mixture containing 2-amino-anthraquinone, caustic alkali, and an oxidizing agent is reacted to form Indanthrene Blue, the step which consists in adding an aqueous slurry of the 2-amino-anthraquinone to the fused caustic alkali while stirring and maintaining the latter at a temperature between about 195° and about 250° C.

3. In a process for making Indanthrene Blue, the steps which consist in adding an aqueous slurry of 2-amino-anthraquinone to a fused caustic alkali mixture containing an oxidizing agent while stirring and maintaining said fused mixture at a temperature between about 195° and about 250° C., and thereafter continuing the stirring and heating the reaction mixture to a temperature between about 220° and about 250° C.

4. In a process for making Indanthrene Blue, the steps which consist in adding an aqueous slurry of 2-amino-anthraquinone to a fused caustic alkali mixture, containing a compound selected from the class consisting of alkali metal chlorates and nitrates, while stirring and heating said fused mixture to a temperature between about 195° and about 250° C., and thereafter heating the stirred mixture to a temperature between about 220° and about 250° C.

5. In a process for making Indanthrene Blue, the steps which consist in adding an aqueous slurry of 2-amino-anthraquinone to a fused mixture, containing caustic alkali in amount representing at least 3.75 times the weight of the 2-amino-anthraquinone and an oxidizing agent selected from the class consisting of alkali metal chlorates and nitrates, while stirring and heating said fused mixture to a temperature between about 195° and about 250° C., thereafter further heating the mixture at a temperature between about 220° and about 250° C., and separating Indanthrene Blue from the reacted mixture.

6. In a process for making Indanthrene Blue, the step which consists in adding to fused caustic alkali an aqueous slurry of 2-amino-anthraquinone, having an oxidizing agent selected from the class consisting of alkali metal chlorates and alkali metal nitrates dissolved therein.

7. In a process for making Indanthrene Blue, the steps which consist in forming a thick aqueous slurry of 2-amino-anthraquinone, having an oxidizing agent selected from the class consisting of alkali metal chlorates and nitrates dissolved therein, adding said slurry to fused caustic alkali while stirring and maintaining the latter at a temperature between about 195° and about 250° C., and then heating the mixture further at a temperature between about 220° and about 250° C. until reaction is complete.

8. In a process for making Indanthrene Blue, the steps which consist in forming an aqueous slurry of 2-amino-anthraquinone having an oxidizing agent selected from the class consisting of alkali metal chlorates and nitrates dissolved therein, then adding the slurry to a fused mixture, containing caustic alkali in amount representing at least 4 times the molecular equivalent of said 2-amino-anthraquinone, while stirring and heating the fused alkaline mixture to a temperature between about 195° and about 250° C., heating the mixture further at a temperature between about 220° and about 250° C., pouring the reacted mixture into water, and separating Indanthrene Blue from the resultant aqueous mixture.

WILFRED M. MURCH.